United States Patent Office 3,408,105
Patented Oct. 29, 1968

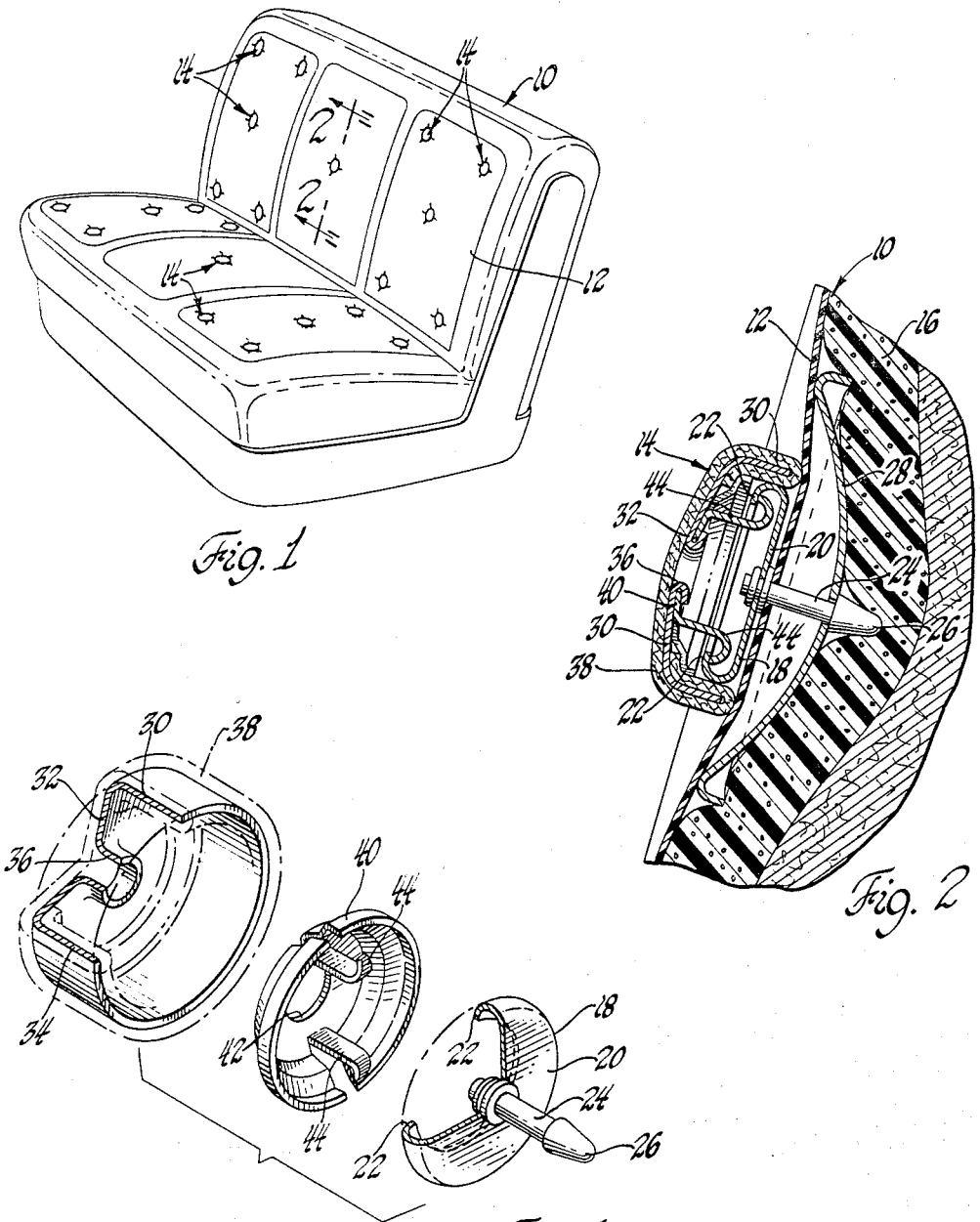

3,408,105
SEAT BUTTON FASTENER
Walter L. Portell, Warren, Mich., assignor to General Motors Corporation, Detroit, Mich., a corporation of Delaware
Filed Nov. 29, 1965, Ser. No. 510,200
2 Claims. (Cl. 297—219)

ABSTRACT OF THE DISCLOSURE

A decorative button for trimming a seat fabric comprises a mounting device extending through and permanently fixed to the fabric and a visible portion of the button concealing the mounting device, with a detachable connection between the visible portion and mounting device.

---

This invention relates to fastening mechanisms and particularly a fastening means for an upholstery button to be used in conjunction with upholstery on seats in vehicles.

Traditionally, seat buttons include an outer shield which is fitted over a socket member by squeezing or crimping. This method of installation presents a serious problem in the area of replacement. Thus, when the outer shield has been separated from the socket it is necessary to remove the upholstery and socket from the seat in order to replace the seat button. This removal is necessary to accommodate the tools required to replace the outer shield on the socket.

It is, therefore, an object of this invention to provide a fastening means for a seat button which will make it possible to replace the outer shield without the necessity of removing the upholstery and socket from the seat cushion. This is accomplished by a snap-on type fastening engagement between the outer shield and the socket.

Other objects, features, and advantages of the subject invention will become clear upon reference to the following detailed description and the drawings illustrating the preferred embodiment thereof, wherein:

FIGURE 1 is a schematic view of the subject invention as used in conjunction with a vehicle seat;

FIGURE 2 is a sectional view in the plane of line 2—2 in FIGURE 1;

FIGURE 3 is a perspective assembly view of the component parts of the seat button incorporating the invention.

More specifically, FIGURE 1 shows a vehicle seat 10 covered by suitable upholstery fabric 12 and including a plurality of seat buttons 14. The details of the seat buttons 14 and the upholstery and seat construction are best seen by referring to FIGURE 2. The upholstery 12 is applied directly over a layer of cushioning material 16 on the seat 10. The seat button assembly 14 is secured to the upholstery and cushion by a socket 18. The socket 18 includes a circular body 20, the periphery of which is turned upwardly and inwardly to form an annular lip 22. A stud 24 extends from the body 20 and includes an enlarged head 26. As seen in FIGURE 2 the socket 18 is mounted relative to the upholstery 12 so that the stud 24 and head 26 extend beneath the upholstery 12 into the layer of cushioning material 16. An annular dished retainer 28 is mounted on the stud 24 between the upholstery 12 and the cushioning material 16. The retainer 28 is placed on the stud 24 prior to the assembly of the upholstery 12 on the seat 10. The assembly described thus far is very similar to those used in many standard seat button assemblies.

The significant aspect of this invention lies in the visible button itself and the snap fastening means between the button and the socket 18. The seat button 14 includes an outer shield 30 which has a base portion 32 integral with an annular skirt 34 and a central mounting hub 36. A layer of covering material 38 is placed over the shield 30 such that it covers the complete exterior of the shield and the interior of the annular skirt 34. An annular insert 40 is placed within the outer shield 30 such that an aperture 42 in the insert 40 fits over the hub 36 of the shield 30. The hub 36 is upset, as shown in FIGURE 2, so as to hold the annular insert 40 to the shield 30. The annular insert 40 has a pair of resilient J-shaped legs 44 formed therefrom which are adapted to snap under the annular lip portion 22 of the socket 18.

The procedure for completing this seat button assembly is as follows:

The socket 18 and its retainer 28 are assembled to the upholstery 12, which is then placed on the seat 10. The seat button 14 including the shield 30 covered by fabric 38 and containing the annular insert 40 is then snapped over the socket 18 so that the ends of the J-shaped legs 44 snap under the lip 22 and the annular skirt 34 surrounds the outside of the periphery of the socket 18. It should be apparent that no tools are necessary for the placement of the seat button on the socket assembly. Therefore, if in service a seat button inadvertently is removed from the socket assembly a new one can be fastened to the socket without removing the upholstery from the seat.

Hence, this invention provides a seat button fastening means which can greatly reduce the time and expense involved in both initially assembling seat buttons and replacing seat buttons. It further provides a seat button assembly which uses a standard seat button socket and mounting assembly. In addition, the novel seat button itself is relatively simple in construction and economical to produce.

Although but one embodiment of the subject invention has been shown and described in detail it should be obvious to those skilled in the art to which the invention pertains that many changes and modifications may be made thereto without departing from the scope of the invention.

I claim:

1. A seat structure comprising, in combination, a seat, a layer of upholstery fabric covering at least part of the seat and defining an exterior surface of the seat, and a plural number of seat button assemblies fixed to the said fabric, each of said assemblies comprising a mounting device extending through the said fabric and having portions at the outer and inner sides of the fabric retaining the mounting device against removal from the fabric, said mounting device forming a retaining member, a visible button including an external layer of decorative fabric enclosed and concealing said retaining member on the outer side of the upholstery fabric, and resilient means on said button engaging said retaining member providing a readily attachable and detachable concealed connection between the button and mounting device, thus providing for convenient replacement of any said button upon loss thereof or damage thereto.

2. A seat structure comprising, in combination, a seat, a layer of upholstery fabric covering at least part of the seat and defining an exterior surface of the seat, and a plural number of seat button assemblies fixed to the said fabric, each of said assemblies comprising a mounting device extending through the said fabric and having portions at the outer and inner sides of the fabric retaining the mounting device against removal from the fabric, said mounting device including an inwardly turned lip on the outer fabric side thereof, a visible button including an external layer of decorative fabric enclosing and concealing the portion of the mounting device at the outer side of the upholstery fabric, and an insert retained within said button and securing the fabric thereto, said insert including resilient J-shaped legs engaging said inturned lip providing a readily attachable and detachable concealed connection between the button and said mounting device.

References Cited

UNITED STATES PATENTS

| | | | |
|---|---|---|---|
| 3,103,082 | 9/1963 | Baermann | 5—356 |
| 2,627,778 | 2/1953 | Hodell | 85—55 |

FOREIGN PATENTS

| | | |
|---|---|---|
| 923,110 | 2/1955 | Germany. |
| 367,913 | 9/1906 | France. |
| 18,503 | 1913 | Great Britain. |

BOBBY R. GAY, *Primary Examiner.*

ERNEST SIMONSEN, *Assistant Examiner.*